US011458912B2

(12) United States Patent
Kroeger

(10) Patent No.: US 11,458,912 B2
(45) Date of Patent: Oct. 4, 2022

(54) SENSOR VALIDATION USING SEMANTIC SEGMENTATION INFORMATION

(71) Applicant: Zoox, Inc., Foster City, CA (US)

(72) Inventor: Till Kroeger, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 313 days.

(21) Appl. No.: 16/297,127

(22) Filed: Mar. 8, 2019

(65) Prior Publication Data

US 2020/0282929 A1 Sep. 10, 2020

(51) Int. Cl.
*B60R 16/023* (2006.01)
*B60R 11/04* (2006.01)
*G06T 7/80* (2017.01)
*G01S 7/497* (2006.01)
*G01S 7/40* (2006.01)
*G01S 13/931* (2020.01)
*G01S 17/931* (2020.01)

(52) U.S. Cl.
CPC .......... *B60R 16/0232* (2013.01); *B60R 11/04* (2013.01); *G01S 7/4021* (2013.01); *G01S 7/4972* (2013.01); *G01S 13/931* (2013.01); *G01S 17/931* (2020.01); *G06T 7/80* (2017.01)

(58) Field of Classification Search
CPC ....... B60R 16/0232; B60R 11/04; G06T 7/80; G01S 17/931; G01S 7/4021; G01S 7/4972; G01S 13/931
See application file for complete search history.

(56) References Cited

U.S. PATENT DOCUMENTS

| 9,731,729 B2 | 8/2017 | Solyom et al. |
| 2002/0087253 A1* | 7/2002 | Jeon ................... G06K 9/00798 701/93 |
| 2010/0250051 A1* | 9/2010 | Nestico .................... F02C 9/44 701/31.4 |
| 2014/0368651 A1* | 12/2014 | Irschara ................... G06T 7/80 348/148 |
| 2016/0356594 A1* | 12/2016 | Sorenson ................ G01S 17/10 |
| 2017/0019589 A1* | 1/2017 | Moon .................. H04N 5/2356 |

(Continued)

FOREIGN PATENT DOCUMENTS

RU 2012126039 A 12/2013
WO WO2018156451 A1 8/2018

OTHER PUBLICATIONS

PCT Search Report and Written Opinion dated Jun. 11, 2020 for PCT Application No. PCT/US2020/021094, 9 pages.

(Continued)

*Primary Examiner* — Hussein Elchanti
(74) *Attorney, Agent, or Firm* — Lee & Hayes, P.C.

(57) ABSTRACT

This disclosure is directed to validating a calibration of and/or calibrating sensors using semantic segmentation information about an environment. For example, the semantic segmentation information can identify bounds of objects, such as invariant objects, in the environment. Techniques described herein may determine sensor data associated with the invariant objects and compare that data to a feature known from the invariant object. Misalignment of sensor data with the known feature can be indicative of a calibration error. In some implementations, the calibration error can be determined as a distance between the sensor data and a line or plane representing a portion of the invariant object.

20 Claims, 6 Drawing Sheets

(56) References Cited

U.S. PATENT DOCUMENTS

2017/0124781 A1* 5/2017 Douillard ......... G08G 1/096816
2018/0074506 A1   3/2018 Branson
2020/0043063 A1* 2/2020 London ............. G06Q 30/0281
2020/0081092 A1* 3/2020 Choi ................... G01S 13/931
2020/0103920 A1* 4/2020 Castorena Martinez ....................
                                                  G01S 17/42

OTHER PUBLICATIONS

PCT International Preliminary Report on Patentability dated Sep. 23, 2021 for PCT Application No. PCT/US2020/021094, 7 pages.

\* cited by examiner

SENSOR VALIDATION USING SEMANTIC SEGMENTATION INFORMATION

BACKGROUND

Various systems use sensors to acquire information about a surrounding environment. For example, an autonomous vehicle may have multiple cameras, LIDAR sensors, time-of-flight sensors, radar sensors, and/or other sensors to detect objects, e.g., objects approaching the vehicle and/or objects the vehicle is approaching. Sensor data about those objects can be necessary to navigate through the environment, e.g., while avoiding those objects. In some environments, including those in which other pedestrians, bicyclists, and other vehicles may be present, potentially fatal collisions may occur if such sensors are not calibrated properly. Accordingly, calibrating sensors and verifying that sensors remain properly calibrated during use, may be critically important.

Current calibration techniques use infrastructure, such as fiducial markers, to calibrate sensors. Fiducial markers can include checkerboards, crosses, or other known images for image calibration, as well as other points of known reflectivity or producing known emissions in known configurations for other sensor modalities. Generated sensor data associated with the fiducial marker can be compared to known parameters of the fiducial marker in order to determine various sensor parameters (e.g., camera extrinsics and intrinsics). While the infrastructure may be readily available at a location at which a system is manufactured or at other, e.g., service or management, locations, subsequent calibration and/or calibration verification requires bringing the system (e.g. the autonomous vehicle) to a location that has the infrastructure and/or bringing the infrastructure to the system. This may result in undesirable downtime for the system and/or, for those examples which rely on sensors for navigation, potentially unsafe travel to the location. Additionally, current calibration techniques may require a human operator, which may make the process manual, slow, and potentially imprecise. Existing calibration techniques that attempt to mitigate these drawbacks are often computationally expensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
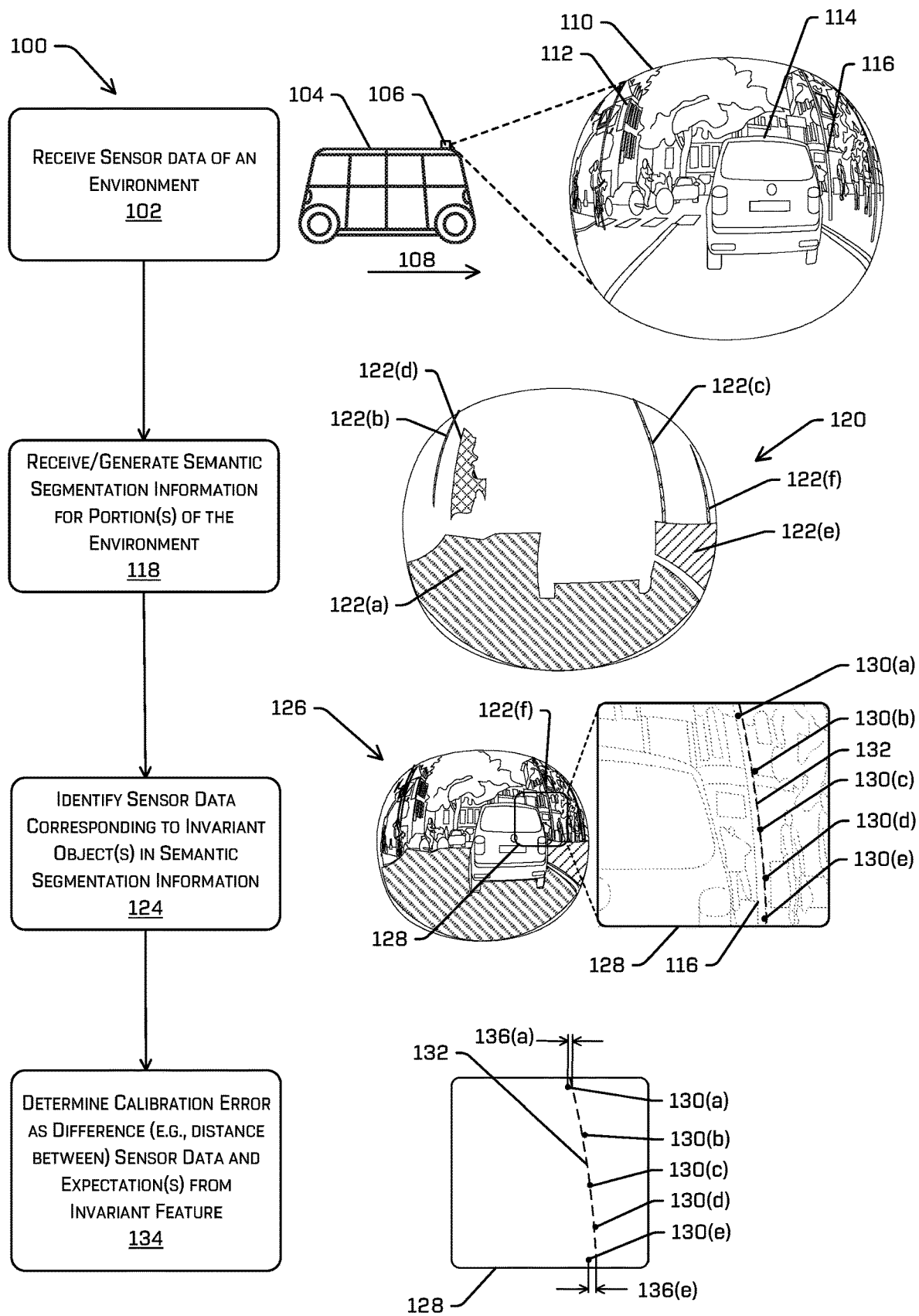
FIG. 1 includes textual and visual flowcharts to illustrate an example method for verifying proper sensor calibration of sensors mounted on an autonomous vehicle using semantic segmentation information in accordance with implementations described herein.

Techniques described herein are directed to verifying calibration of and/or calibrating sensors of a system without infrastructure, e.g., without fiducial markers. In general, such calibration may refer to either "extrinsic" calibration (that is determining one or more of a location or orientation of the sensor relative to some origin, e.g. another sensor, an origin of the system, etc.) or "intrinsic" calibration (that is determining one or more parameters about the sensor itself, e.g., a focal length, a center point, a lens distortion model, and the like). Throughout the specification, an example of such a system is an autonomous vehicle having multiple sensors (of various modalities), though any other system is contemplated (e.g. smartphones having an image sensor, robotic manipulators having one or more sensor modalities, and the like). In one such example (i.e. where the system is an autonomous vehicle), the autonomous vehicle can include a sensor configured to generate sensor data of an environment of the vehicle. The vehicle may also generate or otherwise access semantic segmentation information that identifies objects in the environment. For instance, semantic segmentation information may classify sensor data, e.g., on a pixel-by-pixel or point-by-point basis to associate each pixel or point with an object or object type. When the sensor is correctly calibrated (e.g., internally), the sensor data and the semantic segmentation information can be combined to produce an aligned representation of the environment. However, when the sensors are improperly calibrated, e.g., there is a calibration error, the sensor data and the semantic segmentation information, when combined, can form an inaccurate, or "blurry," representation of the environment. In a real-world example, as applied to autonomous vehicles and as an illustration of the need for a highly accurate calibration, a misalignment of sensors on the order of 0.5-degrees may result in an inability to determine with certainty a lane in which an object 100 meters away is travelling. Thus, while sensors are calibrated upon installation to meet these exacting standards, it may be important to verify that sensors remain properly calibrated. For instance, sensors may be subject to environmental contaminants, degradation due to normal driving and use, as well other factors that can cause sensors to develop calibration errors.

In examples described herein, calibration techniques can be used to validate calibration of and/or calibrate one or more sensors mounted on a vehicle. In some implementations, sensors of one or more modalities may be mounted to capture sensor data, e.g., images, radar returns, LiDAR returns, time-of-flight data, or the like, covering the 360-degrees around the autonomous vehicle, and each sensor can provide sensor data necessary to ensure safe navigation of the vehicle, i.e., relative to objects in the environment of the vehicle. The calibration techniques can include leveraging semantic segmentation information to determine calibration errors. More specifically, techniques can include determining objects in semantic segmentation information and comparing features in sensor data generated by a sensor to the object. For example, objects in the semantic segmentation information can include invariant objects, which may include fixed and/or known objects that may not change or move over time and/or for which one or more attributes, such as geometric attributes, reflective features, or the like are readily known. For instance, invariant objects can include linear objects, such as posts, the horizon, corners, roof lines of vehicles, or buildings, and the like. Invariant objects may also include planar surfaces, such as street signs, a road surface, a sidewalk surface, the side of a building, a side of a trailer or large automobile, and the like. In other examples, street signs may be known to be retroreflective. In still further examples the invariant objects may have other attributes that are known or knowable. In at least other examples, such invariance may correspond to features and/or attributes of the object and not the object itself. As a non-limiting example of such, a tractor trailer may move, yet have planar surfaces and straight-lines of intersection of such surfaces. Similarly, traffic light poles may change state (red, yellow, green, etc.), while having a same relative position, orientation, geometric features, or the like.

In some implementations, features can be extracted from the sensor data to compare to the object(s) in the semantic segmentation information. By way of non-limiting example, edges can be detected in the sensor data, e.g., using an edge detection algorithm in an image or depth discontinuities in three-dimensional sensor data. Such edges may be investigated to determine whether they are linear, as expected from the a priori knowledge about the invariant object. In other implementations, points, e.g., having a depth measurement, can be identified as being associated with a planar surface in an invariant object. Those points can then be investigated to confirm coplanarity. In some examples, the features may be determined from undistorted data, e.g., undistorted using parameters, e.g., intrinsics, of the sensor. In at least some examples, errors may determined with respect to the distorted space (e.g., how far point fall from an expected distorted line or plane) or the undistorted space (e.g., a measure of collinearity or coplanarity).

As noted above, sensed features should closely align with objects from the semantic segmentation information in a well-calibrated sensor. On the other hand, misalignment may be indicative of a calibration error in the sensor. Thus, according to implementations described herein, techniques can quantify how much features in the sensor data deviate from their expected value, e.g., how much they deviate from co-linearity or coplanarity expected from the attributes of the invariant object. Also in some instances, a misalignment can be quantified, e.g., as a distance between points or pixels in the sensor data and the expectation embodied by the invariant object determined from the semantic segmentation information.

In some examples, the calibration error can be compared to a threshold error, e.g., to determine whether the error is acceptable, of if some corrective action must be taken. Corrective actions can include taking the sensor offline, taking the vehicle offline, recalibrating the sensor, controlling the vehicle at the exclusion of sensor data from the sensor, or the like. In some instances, the calibration data can be used to determine updated calibration information, and subsequently-acquired sensor data can be calibrated using the updated calibration information.

Validation and calibration techniques discussed herein can improve the functioning of a computing device by providing a framework to determine optimal calibration for sensors, e.g., an array of cameras, on an autonomous vehicle. By validating and/or calibrating one or more cameras using the calibration techniques described herein, the cameras can generate data representing an environment with a high degree of accuracy and precision about the environment. For example, cameras that have been calibrated in this manner can provide more accurate data for route planning, etc., which can ultimately lead to better safety outcomes while driving. Furthermore, such improved calibration may improve processing and perception systems, for example, by providing more accurate starting points and better fused data. These and other improvements to the functioning of a computing device are discussed.

The calibration techniques discussed herein also represent improvements over conventional calibration and/or calibration validation. For example, in the past, calibration techniques often required fiducial markers or other infrastructure. For example, some techniques have included mounting a vehicle on a turntable and physically turning the vehicle while monitoring the data captured by sensors on the vehicle. Other systems required human operators to wave such fiducials in the sensors of such vehicles. Such conventional calibration techniques suffer from limited flexibility, often require additional and/or specialized calibration equipment, and/or result in a suboptimal calibration of the sensors. In contrast, the techniques described herein may allow for infrastructure-free calibration. Techniques described herein can also result in safer operation of a vehicle. For instance, techniques described herein may be able to verify and/or validate calibration information as a vehicle traverses through an environment, e.g., by comparing features in new data to objects in semantic segmentation information, as the new data is generated by the sensor. Thus, unsafe calibrations can be identified in real-time or near real-time, and corrective action can be taken more readily. Moreover, because the techniques described require only sensor data captured by the sensor, calibration of sensors may be done on historical data and/or on simulated data. Thus, the techniques discussed herein represent significant improvement over conventional calibration.

The methods, apparatuses and systems described herein can be implemented in a number of ways. Example implementations are provided below with reference to the following figures. Although discussed in the context of an autonomous vehicle, the methods, apparatuses, and systems described herein can be applied to a variety of systems requiring calibration of sensors prior to and/or during use and/or validation of such calibration. The techniques described herein are not limited to autonomous vehicles. In another example, the methods, apparatuses, and systems may be utilized in an aviation or nautical context. Additionally, the techniques described herein may be used with real data (e.g., captured using one or more sensors), simulated data (e.g., generated by a simulator) or any combination of the two.

FIG. 1 depicts a pictorial flow diagram of an example process 100 for validating calibration of a sensor disposed on an autonomous vehicle, in accordance with implementations of this disclosure. In this example, the process 100 determines whether sensor data comports with features or other known attributes of invariant objects determined from semantic segmentation (e.g., classification) information about an environment of the vehicle to detect calibration errors. Of course, sensor data may be segmented according to various other (e.g., drivable surfaces, planar surfaces, expected linear edged portions, and the like).

At operation 102, the process 100 can include receiving sensor data of an environment. An example accompanying the operation 102 illustrates a vehicle 104 having a sensor 106, e.g., a camera, disposed on the vehicle 104. In the illustrated example, the vehicle 104 is traversing through the environment generally in a direction indicated by an arrow 108, although in other embodiments the vehicle may be stationary or moving in a different direction. As also illustrated, the sensor 106 captures sensor data such as an image 110. In the illustrated embodiment, the sensor 106 may be a camera or other sensor configured to capture the image 110, e.g., using a wide-angle or fish-eye lens. Accordingly, the image 110 may be a distorted image, e.g., having radial distortion caused by the lens of the camera. The sensor 106 can be other types of cameras, e.g., linear cameras, or the like or the sensor 106 can be a different modality of sensor altogether. By way of non-limiting example, the sensor 106 may be a LiDAR sensor or time-of-flight sensor that generates depth information associated with light returns, or the like. The sensor 106 and the image 110 are for example only, and other or additional sensors, e.g., of the same or different modalities may also or alternatively be provided.

As illustrated, the image 110 includes image data about a plurality of objects in the environment. For example, the image 110 depicts a building 112, a vehicle 114, a lamppost 116, and other features. As will be appreciated, the image 110 may include sensed data about invariant, variant, static, dynamic, and/or any features in the field of view of the sensor 106.

Figure 3:
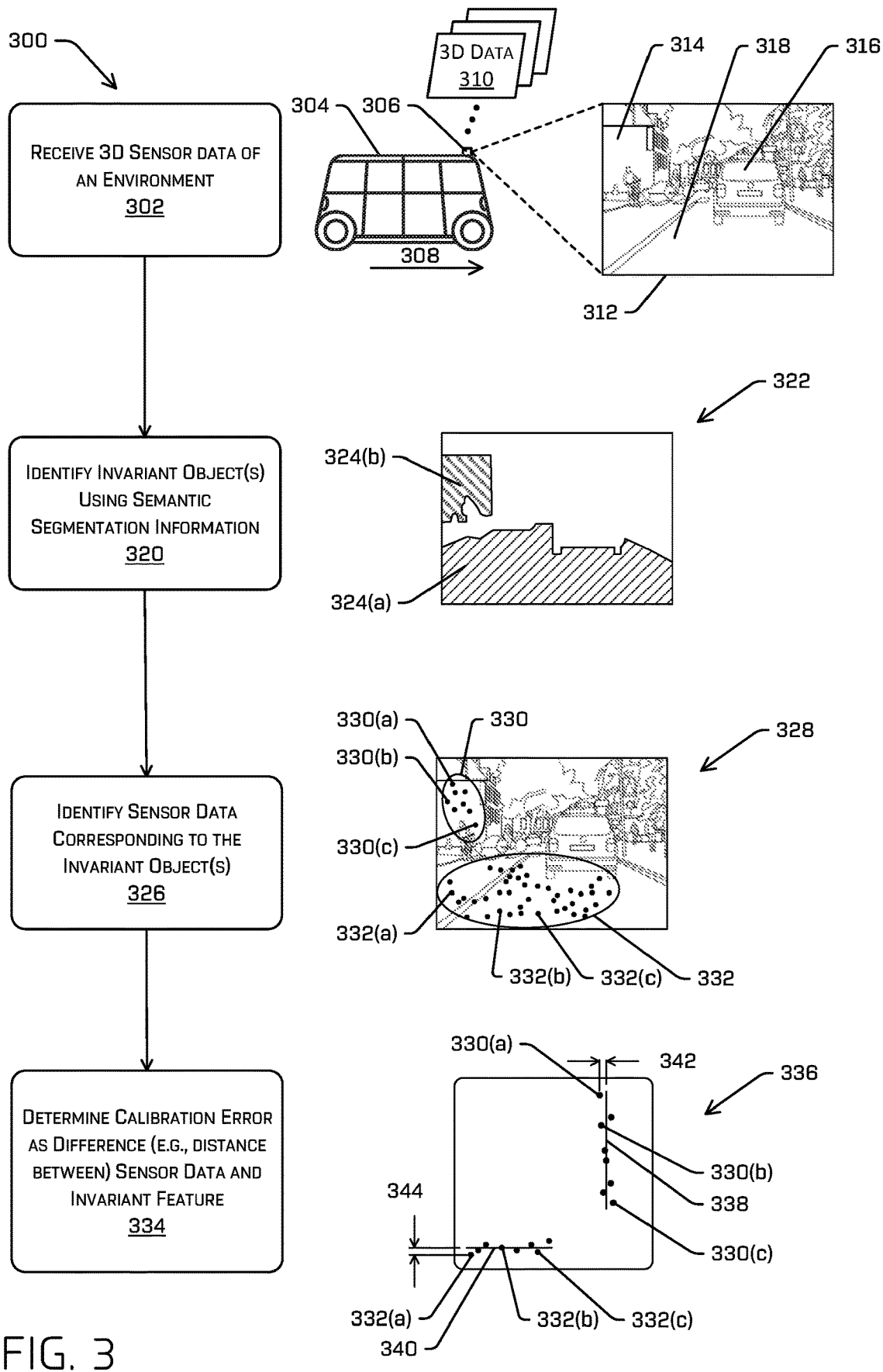
FIG. 3 includes textual and visual flowcharts to illustrate an example method for verifying proper sensor calibration of a three-dimensional sensor mounted on a vehicle using semantic segmentation information in accordance with implementations described herein.

At operation 118, the process can include receiving and/or generating semantic segmentation information about the environment (e.g., based at least in part on the sensor data obtained in 102). An example accompanying the operation 118 illustrates a semantic segmentation representation 120 indicating classification information about a portion of the environment. More specifically, the representation 120 includes graphical object representations 122(a), 122(b), (collectively referred to herein as "the object representations 122") of different objects or features in the environment, e.g., based on classifications of those objects. For example, the object representations 122 include a drivable surface representation 122(a), lamp post representations 122(b), 122(c), a building representation 122(d), a sidewalk representation 122(e), and a street sign representation 122(f). In this example, each of the respective object representations 106 visually identifies pixels having the same label or classification. Accordingly, the drivable surface representation 122(a) includes pixels having a "drivable surface" label or classification, the lamp post representations 122(b), 122(c) include pixels having a "lamp post" label or classification, and so forth. Thus, for example, the semantic segmentation information can include per-pixel classification information. As noted above, although FIG. 1 is described in terms of the sensor 106 being a camera generating the image 110, other sensor modalities also are contemplated (for instance, FIG. 3 illustrates an example of techniques using a three-dimensional sensor). Similarly, the semantic segmentation information can be generated from data from one or more sensor modalities, which may or may not include the sensor 106.

As illustrated in FIG. 1, the semantic segmentation information can include information about invariant objects. As used herein, "invariant objects" may be objects that have known characteristics or attributes, such as linear edges, planar surfaces, a known orientation, or the like. In some examples, invariant objects may be objects that are fixed in the environment, e.g., that are generally expected to remain the same or unmoved. For example, invariant objects can be topographical features, e.g., road surfaces, sidewalk surfaces, some trees, or the like, fixtures, e.g., buildings, street signs, lampposts, fire hydrants, guardrails, or the like, or other generally stationary objects or features having a known structure and/or orientation. In some examples of this disclosure, the horizon can be an invariant object, for instance. In still further examples, invariant objects can include non-stationary objects having some known characteristic or attribute. For example, a trailer of a tractor-trailer may be an invariant object because it may have known linear edges and/or planar sides. Implementations of this disclosure may use semantic segmentation information about invariant objects, and FIG. 1 shows only object representation 122 associated with invariant objects. In other implementations, the semantic segmentation information can include additional semantic segmentation information, e.g., of non-invariant objects, including but not limited to information about vehicles (like the vehicle 114), pedestrians, bicyclists, or the like. Techniques described herein, however, may only consider data associated with invariant objects. As will be appreciated, the bounds of the invariant objects may vary based on the variant objects in the environment, and the semantic segmentation information can be generated in near-real time, as described further herein.

At operation 124, the process 100 includes identifying sensor data corresponding to one or more invariant objects in the semantic segmentation information. An example accompanying the operation 124 illustrates a composite representation 126 including both the object representations 122 from the semantic segmentation information and the sensor data from the image 110. As illustrated, image data corresponding to one of the invariant objects should represent a feature known to be associated with the invariant object. For instance, the image data associated with the building 112, as identified by the object representation 122(b) should have a vertical edge, e.g., at corners of the building, and/or a horizontal edge, e.g., at the bottom of the building, the roofline, or the like. Similarly, image data associated with the lamppost 116 should have two vertical edges, e.g., at the lateral extents of the lamppost, because the lamppost 116 is known to be relatively straight and/or have a vertical orientation. However, and as discussed above, many factors may influence the actual calibration of the sensor 106. For example, manufacturing and/or assembly tolerances associated with the sensor 106, the vehicle 104, sensor mounts (not shown) retaining the sensor 106 on the vehicle 104, and/or the like, may result in improper calibration of the sensor 106 relative to an expectation. Additionally, the sensor 106 may become uncalibrated through regular driving, e.g., due to vibrations associated with the vehicle 104, environmental variations, such as temperature, and/or other factors. Techniques described herein are useful in identifying misalignment caused by these and other sources.

As further illustrated in the example accompanying the operation 124, a magnified portion 128 shows, in more detail, a comparison of the sensor data, e.g., the image 110, to an expectation of the image data, e.g., corresponding to an invariant feature, gleaned from the semantic segmentation information. More specifically, the magnified portion 128 provides a visualization of a portion of the image 110 including the lamppost 116. In this example, the lamppost 116 may be an invariant object, e.g., because it includes a (vertical) linear edge or shape. As shown, the operation 124 can identify points 130(a), 130(b), 130(c), 130(d), 130(e) (collectively, "the points 130") that are associated with the lamppost 116, e.g., based on the semantic segmentation information. In some implementations, the points 130 can be the outer-most (e.g., in the lateral direction in the example) points associated with the lamppost by the semantic segmentation information. In other examples, the points 130 can be determined as image features, e.g., edges determined using an edge detection technique. For example, such image features may correspond to, for example, AKAZE, BRISK, SURF, SIFT, ORB, BRIEF, FAST, FREAK, embeddings, and the like. In the illustrated example, the points 130 are representative of points comprising an edge of the lamppost 116. As noted, because one or more attributes or characteristics of the lamppost 116 are known, e.g., because the lamppost is an invariant object, the points 130 are expected to exhibit those attributes or characteristics. As shown in the magnified portion 128, for example, the points 130 may be expected to lie along an arc 132, which may represent the (known) shape of the lamppost 116. As will be appreciated, because the image 110 of FIG. 1 is distorted, e.g., it exhibits radial distortion because of the lens of the sensor 106, the arc 132 may correspond to a known distortion, e.g., caused by known intrinsics of the sensor 106. Stated differently, the arc 132 corresponds to a vertical line distorted by the intrinsics of the sensor 106. Although FIG. 1 depicts only a single image 110 or frame, in some examples multiple frames may be captured, and feature matching, e.g., detecting the edge of the lamppost 116, may be performed over a plurality of frames.

The operation 124 may determine the points 130 corresponding to the feature, e.g., the signpost, using feature matching. For example, the techniques described herein may extract and match image features, e.g., local features, from the image 110 with other images, e.g., in previous or adjacent frames and/or captured by other sensors. Although five points 130 are illustrated in the example accompanying the operation 124, smaller or larger sets of points may be used. Moreover, although for clarity the example of FIG. 1 shows only association of a single feature with an object representation, i.e., an edge associated with the lamppost 116, in other implementations data associated with more than one invariant object/feature may be identified in the operation 124. By way of non-limiting example, points in the image 110 corresponding to the building 112 may be considered and compared to determine collinearity at an edge, e.g., corner, roof-line, or the like, of the building.

At operation 134, the process can include determining a calibration error for the sensor. For example, techniques described herein may determine the error based on a distance between the sensor data and an expected value (based on the known attributes of the invariant objects) associated with those points. In at least one example, such an error may comprise the distance between individual of the points 130 and the arc 132, with the arc 132 being the expected shape of the lamppost 116 (e.g., by applying a known distortion based on assumed sensor parameters into same space). The graphical example accompanying the operation 134 in FIG. 1 provides a visualization of this technique. Specifically, the example shows the magnified portion 128 including only the arc 132 and the points 130 for clarity. As illustrated, the first point 130(a) is offset, e.g., by a distance 136(a), relative to the arc 132. Other of the points 130 may also be offset relative to the arc 132. For example, a distance 136(e) of the offset of the fifth point 130(e) from the arc 132 also is shown in FIG. 1. As noted above, when the sensor 106 is properly calibrated, the points 130 would appear on the arc 132, as the arc 132 takes the expected shape of an edge of the lamppost 116. The distances 134(a), 134(e) may represent the calibration error. In some examples, the distances 134(a), 134(e) can be Euclidian distances, measured in pixels, between the respective points 130 and the arc 132. In some examples, the distance may be dependent on other features of the sensor (for examples, fish eye cameras may have high radial distortion and Euclidian distances determined for errors may be inversely scaled with respect to a radius). In other examples, an arc may be fit to the points 130, with the arc being compared to the arc 132 to determine the calibration error. In some implementations, if the error determined at the operation 134 is within, e.g., equal to or less than, some threshold error, the sensor 106 may be determined to be properly calibrated. However, if one or more errors are outside of, e.g., equal to or greater than, some threshold error, the sensor 106 may be determined to have incorrect calibration.

In some implementations, the semantic segmentation information can include labels for all pixels in a scene, and thus the pixels 130 can be determined as the outermost pixels having the "signpost" label or classification. In some implementations a line may be fit to the pixels, with the line representing the signpost in the semantic segmentation information.

Because the process 100 uses sensor data captured as the vehicle 104 traverses through an environment (and on semantic segmentation information generated contemporaneously with and/or based on the sensor data), e.g., not on fiducial markers or other infrastructure, the process 100 can be implemented regardless of time or location. In some implementations, the process 100 can be implemented in near-real time, while the autonomous vehicle 104 is in operation. Thus, implementations described herein may identify sensor misalignment as that misalignment occurs, to promote improved sensor accuracy. In some implementations, the semantic segmentation information may also be generated in near-real time, e.g., by a perception system of the vehicle. In other implementations, e.g., when the vehicle 104 can be accurately localized in the environment, some or all of the semantic segmentation information can be previously determined, e.g., as map data or the like.

Moreover, although FIG. 1 depicts a single image 110 generated by a single sensor 106, in other implementations the sensor 106 can capture sensor data over a period of time, e.g., at a predetermined frequency, and the sensor data can be processed to determine an overall, e.g., average, calibration error for the sensor over the period of time and/or relative to a number of objects in the semantic segmentation information.

Depending on many factors, including but not limited to the type of sensor, environmental conditions to which the sensor is subjected, or the like, well-calibrated sensors can develop calibration errors. For example, manufacturing and/or assembly tolerances, including but not limited to distortion parameters such as focal length, lens geometry, center point, camera model (linear, polynomial, etc.) with corresponding coefficients, and/or the like, may result in introduction of errors. For example, though an initial intrinsic calibration may be correct, the camera lens may distort over time, e.g., through temperature fluctuations, routine maintenance, or the like. Techniques described herein are useful in identifying errors in sensor calibration as may be caused by these and other sources.

Figure 2:
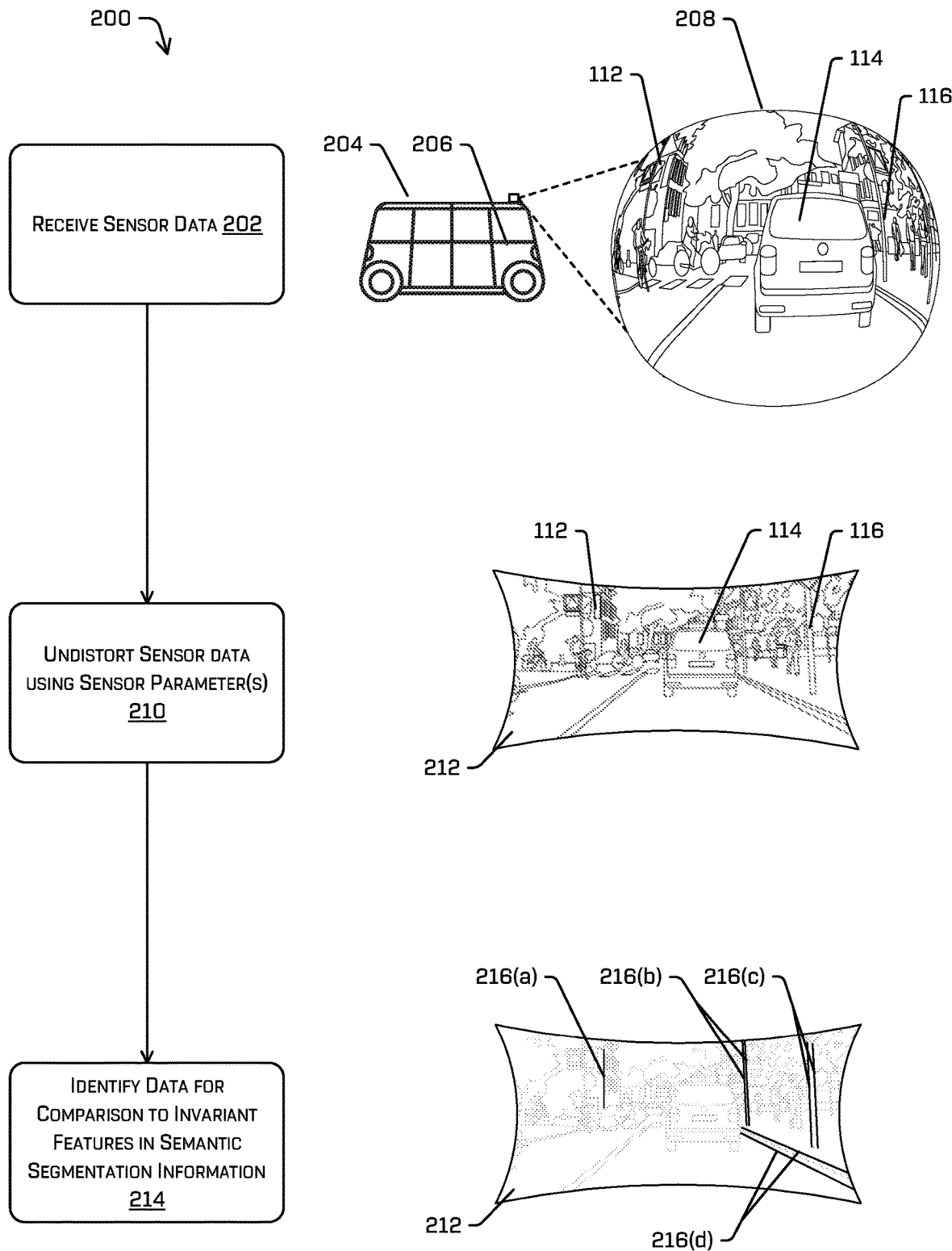
FIG. 2 includes textual and visual flowcharts to illustrate an example method for undistorting sensor data captured by a sensor mounted on a vehicle prior to comparing the sensor data to semantic segmentation information, in accordance with implementations described herein.

As discussed, the process 100 may be useful to identify calibration errors in a sensor by comparing features in the sensor data to features, e.g., lines, planes, found in objects identified using semantic segmentation information. In some instances, as in the example of FIG. 1, the sensor data may be distorted. Accordingly, in some examples the distorted sensor data may be undistorted prior to determining whether the sensor is properly calibrated. Thus, for example, in FIG. 1, the lamppost 116 may be an invariant object, because it is generally straight and/or vertical. Of course, the image 110 shows the lamppost 116 as arcuate, and thus the process 100 included the arc 132 as being an expected representation of an edge of the lamppost 116 in the camera space of the sensor 104. FIG. 2 illustrates a process 200 that may be used in alternative implementations of this disclosure to determine features in distorted sensor data.

At operation 202, the process can include receiving sensor data. An example accompanying the operation 202 illustrates a vehicle 204 and a sensor 206 disposed on the vehicle 204 for capturing sensor data of an environment of the vehicle 204. As also illustrated, the sensor 206 captures sensor data, such as image data, including an image 208. Thus, the operation 202 may be substantially the same as the operation 102. As illustrated, the image 208 includes a great deal of distortion; the sensor 206 may be a camera with an ultra-wide-angle lens (e.g., fish eye lens), for example. In the illustrated example, the image 208 may include substantially the same features as the image 110, including the building 112, the vehicle 114, and the lamppost 116. The distortion may increase at increased radial distances from a center of the image 208, with edges of the image being particularly distorted.

At operation 210, the process 200 can include undistorting the sensor data using one or more sensor parameters. As shown in the example accompanying the operation 210, the image 208 may be undistorted to generate an undistorted image 212. In the undistorted image 212, features in the image 208 are undistorted into a two-dimensional coordinate system to show a true position of detected points. Thus, for example, in the undistorted image 212, the building 114, vehicle 116 and lamppost 116 more accurately reflect their actual position, shape, and orientation in the world. In various examples, the intrinsics of the sensor 206 may be used to generate the undistorted sensor data. For example, the operation 210 may include undistorting the sensed data, e.g., feature locations, according to a distortion model, e.g., to determine undistorted reference locations. In various examples, the distortion model(s) (e.g., polynomial model, field of view model, etc.) may be determined based on a type of lens of the sensor 206. In the example of the ultra-wide-angle lens of FIG. 2, a field of view distortion model, such as the FOV-M4 distortion model, can be used. Other models may additionally or alternatively be utilized to undistort the sensor data.

At operation 214, the process 200 can include identifying features for comparison to invariant features in semantic segmentation information. In the example accompanying the operation 214, a plurality of edges 216(a), 216(b), 216(c), 216(d) (collectively, "the edges 216") are highlighted in the undistorted image 212. For example, a first edge 216(a) may be an expected edge corresponding to a corner of the building 118, second edges 216(b) may correspond to expected lateral sides of a lamppost, third edges 216(c) may correspond to expected lateral sides of the lamppost 116, and fourth edges 216(c) may correspond to bottom (e.g., contacting the street) and top (e.g., contacting the sidewalk) expected edges of a curb. In the illustrated example, edges in the image 212 may be detected using an edge detection algorithm, such as a Canny edge detection algorithm, may be applied to determine edges in the images. Edge detection may also include applying a distance transform to pixels in the image, e.g., to quantify for each pixel in the image a straight-line distance (i.e. Euclidean distance) to the nearest edge pixel. The edges 216 are for example only, as other features may also or alternatively be identified in the undistorted image 212 for comparison to the semantic segmentation information. Such image features may correspond to, for example, AKAZE, BRISK, SURF, SIFT, ORB, BRIEF, FAST, FREAK, and the like (though any embedding or otherwise is also contemplated).

According to the process 200, features can be extracted from distorted images, e.g., using only the intrinsics of the sensor capturing the images, and, using the method 100 of FIG. 1, these features can be compared to invariant features of invariant objects identified from semantic segmentation information to determine whether the sensor is properly calibrated. Accordingly, for example, the process 200 can be performed between the operation 118 and the operation 124 in FIG. 1.

Because the process 200, like the process 100, relies only on sensor data captured by the autonomous vehicle 204, e.g., not on fiducial markers or other infrastructure, the process 200 can be implemented regardless of time or location. In some implementations, the process 200 can be implemented in real time or near-real time, while the autonomous vehicle 204 is in operation. Thus, implementations described herein identify sensor calibration errors which may occur as parameters of the sensor change during operation, to promote improved sensor accuracy. Moreover, by identifying errors in sensor calibration, immediate action(s) can be taken to mitigate any safety concerns that may be associated with incorrect sensor data.

As noted above, the semantic segmentation information can include information about invariant objects. For example, the invariant objects may be chosen because they have straight edges, e.g., buildings, roofs, lampposts, signposts, the horizon, or the like, or are otherwise planar and/or likely to be perpendicular to a ground plane (driving surface). As noted above, edges identified in sensor data can be compared to the edges in the invariant objects to determine calibration errors. This disclosure is not limited to linear features, however. For instance, the semantic segmentation information may indicate a planar surface, e.g., a side of a building, a face of a road sign, a surface of a road or sidewalk, or the like. For example, sensor data indicative of a surface, e.g., depth data, reflectivity information, intensity information, color information, and/or other data, may be used to indicate a surface that can be compared to a plane in the semantic segmentation information. Other features of an object identified using semantic segmentation information can also be used. For example, semantic segmentation information can be used based at least in part on a relationship of an invariant object to other objects. In some instances, invariance may be with respect to a sensor modality as what is invariant to one sensor modality may not be invariant to another. As a non-limiting example, the reflectivity of a wall may create invariance for a LIDAR sensor, but, due to external illumination, may not be invariant for image intensities, for instance. For instance, the invariant objects may be selected because they are perpendicular to one or more other features. By way of non-limiting examples, techniques described herein may assume that signposts, lampposts, building walls and vertical edges are perpendicular to the ground adjacent those objects and/or the horizon. Similarly, roof lines, and horizontal edges of buildings may be assumed to be horizontal, e.g., parallel to the horizon. Similarly, sides of a building may be assumed to be at right angles relative to each other, and, in some instances, to the ground. In some examples, a known orientation of objects in the environment can help to further determine calibration errors. In the example of FIG. 1, if the edge of the lamppost 116 is known to be vertical, e.g., normal to the horizon, a line (or arc in a distorted image) can be fit to the points 130 and a rotational error associated with that line (or arc) can be calculated. In some examples, both a translational and a rotational error can be determined from a single feature.

Although FIGS. 1 and 2 generally show image data and the comparison of features detected in the image data to sematic segmentation information, this disclosure is not limited to image sensors. By way of non-limiting example, techniques described herein can be used to determine a calibration error associated with many different sensor modalities, including but not limited to LiDAR sensors, time-of-flight sensors, radar sensors, or the like. By way of non-limiting example, techniques like those illustrated in FIG. 1 and described herein can determine a calibration error associated with a LiDAR sensor by comparing depth information generated at the LiDAR sensors, e.g., point-cloud data, to a known (from semantic segmentation information) invariant object. For instance, the invariant object may include a planar surface or multiple planar surfaces having a known arrangement relative to each other. In these examples, depth measurements generated by the LiDAR sensor can be compared to the planar surface(s), e.g., by measuring depth differences between the measured depth and the planar surface. In other examples, edges can be determined at depth discontinuities in LiDAR sensor data, and such edges can be compared to edges from the semantic segmentations information, like the arc 132, described herein. Calibration errors for time-of-flight sensors can be similarly identified using depth measurements and/or image data. Similar techniques may be used for invariants of reflectivity, absorptivity, BRDF, BSSRDF, cross-sectional scattering area, and the like.

FIG. 3 depicts a pictorial flow diagram of an example process 300 for validating calibration of a three-dimensional sensor disposed on an autonomous vehicle, in accordance with implementations of this disclosure. In this example, the process 300 determines whether sensor data from a 3D sensor comports with features or other known attributes of invariant objects identified using semantic segmentation (e.g., classification) information about an environment of the vehicle. As described herein, determining that sensor data does not comport with such features may suggest that the sensor includes calibration errors.

At operation 302, the process 300 can include receiving three-dimensional sensor data of an environment. An example accompanying the operation 302 illustrates a vehicle 304 having a sensor 306 disposed on the vehicle 304. In the illustrated example, the vehicle 304 is traversing through the environment generally in a direction indicated by an arrow 308, although in other embodiments the vehicle may be stationary or moving in a different direction. As also illustrated, the sensor 306 captures three-dimensional sensor data 310 associated with a portion of the environment depicted in the image 312. (While the image 312 is generally shown to provide context, the image 312 may be image data captured contemporaneously with generation of the three-dimensional sensor data 310, e.g., by a sensor other than or incorporated into the sensor 306.) In the illustrated embodiment, the sensor 306 may be a LiDAR sensor or time-of-flight sensor that generates depth information associated with light returns, or the like. The sensor 306, the three-dimensional sensor data 310, and the image 312 are for example only, and other or additional sensors, e.g., of the same or different modalities may also or alternatively be provided.

The image 312 illustrates that the three-dimensional data 310 may be associated with a plurality of objects in the environment. For example, the image 312 depicts a building 314, a vehicle 316, a drivable surface (e.g., a road or street) 318, and other features. As will be appreciated, the three-dimensional may include sensed data about invariant, variant, static, dynamic, and/or any features in the field of view of the sensor 106. Of course, though depicted as an image for illustrative purposes, it is understood that such an environment may be perceived by a lidar sensor, for example, as a point cloud.

At operation 320, the process can include identifying invariant object(s) using semantic segmentation information about the environment (e.g., which may be based at least in part on the three-dimensional sensor data 310 obtained in operation 302, image data associated with the image 312, and/or other data). An example accompanying the operation 320 illustrates a semantic segmentation representation 322 indicating classification information about a portion of the environment corresponding to the three-dimensional sensor data 310. More specifically, the representation 322 includes graphical object representations 324(a), 324(b) (collectively referred to herein as "the object representations 324") of different objects or features in the environment, e.g., based on classifications (semantic segmentation information) of those objects. Such semantic may be performed, for example, according to any one or more techniques, such as those described in U.S. patent application Ser. No. 15/820, 245 entitled "Sensor Data Segmentation" filed on Nov. 21, 2017, the entire contents of which are hereby incorporated by reference. For example, the object representations 324 include a drivable surface representation 324(a) and a building representation 324(b), although any number of representation, as described herein, can also be included. In this example, each of the respective object representations 324 associates data having the same label or classification. Accordingly, the drivable surface representation 324(a) includes data having a "drivable surface" label or classification, the building representations 324(b) includes data having a "building" label or classification, and so forth. Thus, for example, the semantic segmentation information can include per-return, per-point, per-pixel or similar classification information. As discussed above, the semantic segmentation information can be generated from data from one or more sensor modalities, which may or may not include the sensor 106.

As with FIG. 1, in the example of FIG. 3, the semantic segmentation information can include information about invariant objects, e.g., the drivable surface and the building. Implementations of this disclosure may use semantic segmentation information to identify data associated with invariant objects, and FIG. 3 shows only object representations 324 associated with invariant objects. As is understood, the semantic segmentation information may be generated for an entire scene or environment.

At operation 326, the process 300 includes identifying sensor data corresponding to the one or more invariant objects. An example accompanying the operation 326 illustrates a representation 328 showing a plurality of data points 330, 332 corresponding to the three-dimensional sensor data 310. More specifically, the data points 330 are illustrative of points indicated by the semantic segmentation information as being associated with the building 314 and the data points 332 are illustrative of points indicated by the semantic segmentation information as being associated with the drivable surface 318. As described herein, the points 330 and the points 332 should represent a feature known to be associated with the invariant object. For instance, the building 314 and the drivable surface 318 may be chosen because they are known to be substantially planar surfaces. Thus, for example, in a perfectly calibrated sensor 306, all of the points 330 may be expected to lie on a first, vertical plane, and all of the points 332 may be expected to lie on a second, horizontal plane.

The representation 328 shows a number of the points 330, some of which are identified individually with reference numerals 330(a), 330(b), 330(c), and a number of the points 332, some of which are identified individually with reference numerals 332(a), 332(b), 332(c). The number and location of the points 330, 332 are for illustration only, as smaller or larger sets of points may be used. Moreover, although for clarity the example of FIG. 3 shows only association of two features with object representations, i.e., planes associated with the building 314 and the drivable surface 318, in other implementations data associated with more than one invariant object/feature may be identified in the operation 326. By way of non-limiting example, points in the three-dimensional sensor data 310 corresponding to a sidewalk may be considered and compared to determine coplanarity. Moreover, although the example of FIG. 3 describes using planar surface, the three-dimensional sensor data 310 may also be compared to other invariant features, such as lines or edges. For example, depth discontinuities in the three-dimensional sensor data 110 can be used to determine the presence of an edge, and alignment of that edge with the invariant feature can be used to validate sensor calibration.

At operation 334, the process can include determining a calibration error for the sensor 306. For example, techniques described herein may determine the error based on a distance between the sensor data 310 and an expected value (based on the known attributes of the feature(s) of the invariant objects) associated with those points. In at least some examples, the error may be based on a deviation (e.g., Euclidian distance) of all points with respect to the expected plane. The graphical example 336 accompanying the operation 334 in FIG. 3 provides a visualization of this technique. Specifically, the example shows a profile view of the representation 328 including only a vertical line 338 representing a plane corresponding to the building 314 and a horizontal line 340 representing a plane corresponding to the drivable surface 318. As illustrated, various of the points 330 are offset, e.g., by a distance 342, relative to the line (plane) 338. Similarly, various of the points 332 are offset, e.g., by a distance 342, relative to the line (plane) 340. As noted above, when the sensor 306 is properly calibrated, the points 330 would appear on the line 338, as the line 338 takes the expected shape of the side of the building 314. Similarly, the points 332 would appear on the line 340, as the line 340 takes the expected shape of the drivable surface 318. The distances 342, 344 may represent the calibration error. In some examples, the distances 342, 344 can be Euclidian distances, measured in pixels, between the respective points 330, 332 and the lines 338, 340. In other examples, a first plane may be fit to the points 330 and/or a second plane may be fit to the points 332, with the first and second planes being compared to the planes represented by the lines 338, 340 to determine the calibration error. In some implementations, if the error determined at the operation 334 is within, e.g., equal to or less than, some threshold error, the sensor 306 may be determined to be properly calibrated. However, if one or more errors are outside of, e.g., equal to or greater than, some threshold error, the sensor 306 may be determined to have incorrect calibration. In at least some examples, an optimization may be performed with respect to an assumed calibration to minimize the error and find an improved calibration.

In the examples of FIGS. 1-3, semantic segmentation information is used to identify points, pixels, or other portions of sensor data that represent invariant objects. Once identified, the points, pixels, or other portions of sensor data may be compared to a feature of the invariant object, e.g., an invariant feature, to verify calibration of the sensor. The examples are for illustration only, as additional or other invariant features, invariant objects, sensor modalities, or the like may be used.

Figure 4:
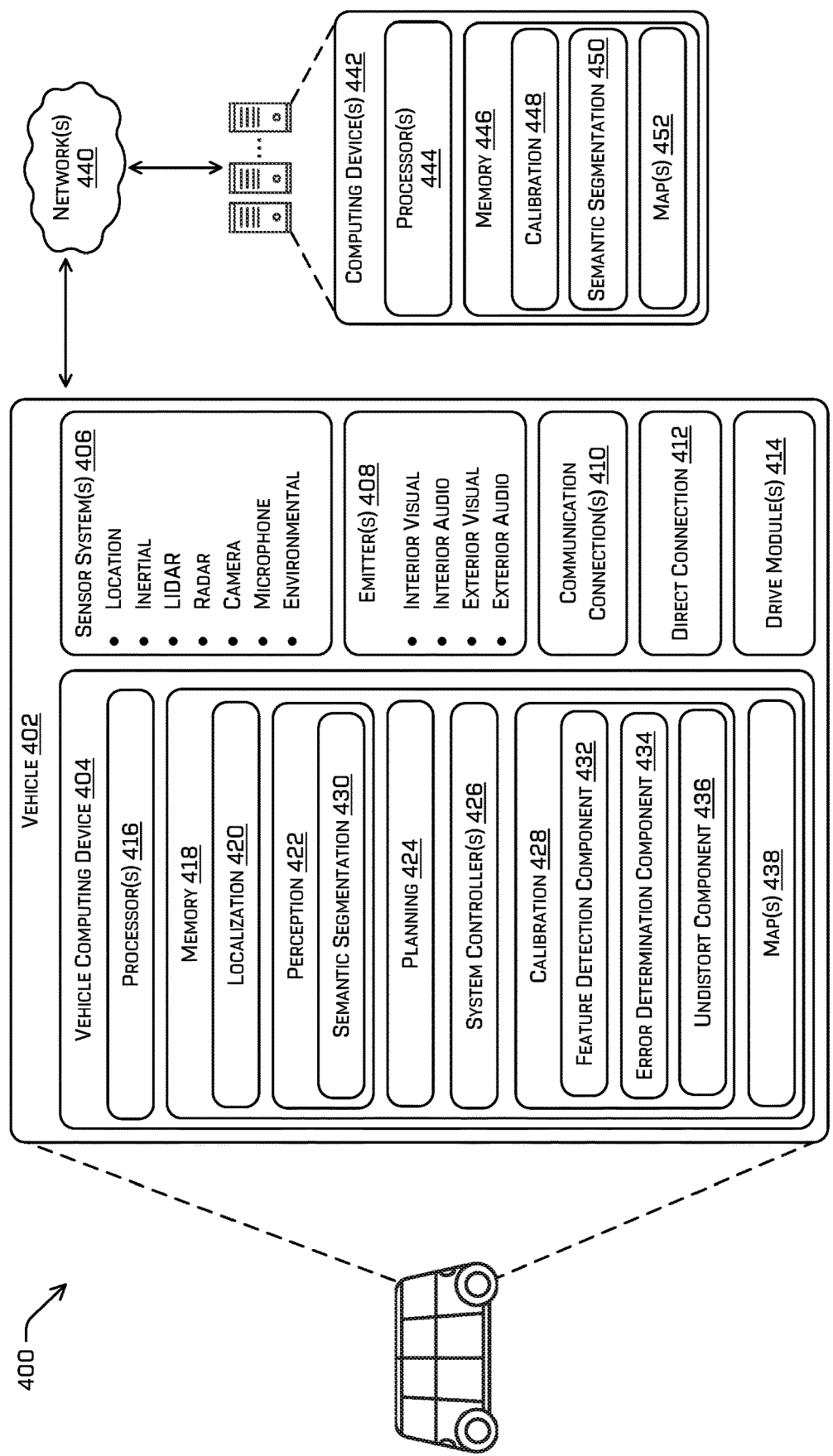
FIG. 4 is a block diagram of an example system for implementing embodiments of verifying sensor calibration, in accordance with implementations described herein.

FIG. 4 illustrates a block diagram of an example system 400 for implementing the techniques described herein. In at least one example, the system 400 can include a vehicle 402, which can be the same vehicle as the vehicle 104 or the vehicle 204 described above with reference to FIGS. 1 and 2, respectively.

The vehicle 402 can include a vehicle computing device 404, one or more sensor systems 406, one or more emitters 408, one or more communication connections 410, at least one direct connection 412, and one or more drive modules 414.

The vehicle computing device 404 can include one or more processors 416 and memory 418 communicatively coupled with the one or more processors 416. In the illustrated example, the vehicle 402 is an autonomous vehicle; however, the vehicle 402 can be any other type of vehicle. Moreover, and as described herein, the techniques described herein are not limited to vehicles, but to any device that has a sensor and access to semantic segmentation information about an environment of the sensor (or otherwise able to generate such information). In the illustrated example, the memory 418 of the vehicle computing device 404 stores a localization component 420, a perception component 422, a planning component 424, one or more system controllers 426, and a calibration component 428. As also illustrated, the perception component 422 can include a semantic segmentation component 430, and the calibration component 428 can include a feature detection component 432, an error determination component 434, and an undistort component 436. The memory 418 can also store one or more map(s) 438. Though depicted in FIG. 4 as residing in memory 418 for illustrative purposes, it is contemplated that several of the features, including the calibration component 428, the semantic segmentation component 430, the map(s) 438 and/or other components may additionally, or alternatively, be accessible to the vehicle 402 (e.g., stored remotely).

In at least one example, the localization component 420 can include functionality to receive data from the sensor system(s) 406 to determine a position of the vehicle 402. For example, the localization component 420 can include, request, and/or receive a three-dimensional map of an environment, e.g., from the map(s) 438, and can continuously determine a location of the autonomous vehicle within the map. In some instances, the localization component 420 can utilize SLAM (simultaneous localization and mapping) or CLAMS (calibration, localization and mapping, simultaneously) to receive image data, LIDAR data, radar data, SONAR data, IMU data, GPS data, wheel encoder data, and/or the like to accurately determine a location of the autonomous vehicle 402. In some instances, the localization component 420 can provide data to various components of the vehicle 402 to determine an initial position of the vehicle 402 for generating a candidate trajectory. As discussed herein, the localization component 420 may receive calibrated sensor data, e.g., sensor data that is within a threshold acceptability, as discussed herein.

In some instances, the perception component 422 can include functionality to perform object detection, segmentation (e.g., semantic segmentation via functionality provided by the semantic segmentation component 430), and/or classification. In some examples, the perception component 422 can provide processed sensor data that indicates a presence of an entity that is proximate to the vehicle 402 and/or a classification of the entity as an entity type (e.g., car, pedestrian, cyclist, animal, tree, road surface, curb, sidewalk, lamppost, signpost, unknown, etc.). In additional and/or alternative examples, the perception component 422 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (e.g., size), etc. Characteristics associated with the environment can include, but are not limited to, a presence of another entity in the environment, a state of another entity in the environment, a time of day, a day of a week, a season, a weather condition, an indication of darkness/light, etc.

As noted above, the perception component 422 can also include the semantic segmentation component 430. In some implementations, the semantic segmentation component 430 may cause the vehicle computing device 404 to perform semantic segmentation on image data, LiDAR data, and/or other sensor data generated by the sensor system(s) 406 to determine classifications or labels associated with pixels, points, or other portions of sensor data. In some embodiments, the semantic segmentation component 430 may include one or more machine learning algorithms trained to identify and segment image data into semantic categories. For example, the semantic segmentation component 430 may include a convolutional neural network (CNN) configured to perform semantic segmentation on images or other sensor data and/or to determine pixel classification probability distributions for pixels of images, though any other form of semantic segmentation on the image is contemplated. In at least some examples, the semantic segmentation component 430 may determine classifications or labels for data components including, but not limited to, car, truck, bicycle, motorcycle, pedestrian, particulate matter, building, road sign, lamppost, signpost, tree, bush, or the like, in addition to, navigable surface, free space, drivable surface, or otherwise. Moreover, various classifications may be identified as invariant objects, having some known attribute, feature or orientation. As described herein, the semantic segmentation information may separately classify one or more invariant objects, which may include lines, planes, or other known features.

In general, the planning component 424 can determine a path for the vehicle 402 to follow to traverse through an environment. For example, the planning component 424 can determine various routes and trajectories and various levels of detail. The planning component 424 may determine a route to travel from a first location (e.g., a current location) to a second location (e.g., a target location). For the purpose of this discussion, a route can be a sequence of waypoints for travelling between the two locations. As non-limiting examples, waypoints can include streets, intersections, global positioning system (GPS) coordinates, etc. Further, the planning component 424 can generate an instruction for guiding the autonomous vehicle along at least a portion of the route from the first location to the second location. In at least one example, the planning component 424 can determine how to guide the autonomous vehicle from a first waypoint in the sequence of waypoints to a second waypoint in the sequence of waypoints. In some examples, the instruction can be a trajectory, or a portion of a trajectory. Also in some examples, multiple trajectories can be substantially simultaneously generated (e.g., within technical tolerances) in accordance with a receding horizon technique.

In at least one example, the vehicle computing device 404 can include the system controller(s) 426, which can be configured to control steering, propulsion, braking, safety, emitter, communication, and other systems of the vehicle 402. The system controller(s) 426 can communicate with and/or control corresponding systems of the drive module(s) 414 and/or other components of the vehicle 402.

In general, the calibration component 428 can include functionality to verify calibration of and/or calibrate one or more sensors operating in connection with the vehicle 402, e.g., one or more of the sensor system(s) 406. For example, the calibration component 428 can detect improperly calibrated sensors, schedule calibration routines, and send calibration data to one or more other components of the vehicle 402 that utilize data produced by the one or more sensors.

The feature detection component 432 can analyze image data to determine features, e.g., edges, planar surfaces, or the like. Such image features may correspond to, for example, AKAZE, BRISK, SURF, SIFT, ORB, BRIEF, FAST, FREAK, embeddings, and the like. In other examples, the feature detection component 432 can apply a Canny edge detection algorithm to detect edges in images captured by cameras mounted on the vehicle 402. In other examples, the feature detection component 432 can identify edges based on depth discontinuities, e.g., in LiDAR, time-of-flight, and/or other returns having depth information. For example, in implementations described herein, edges detected by the feature detection component 432 can be compared to semantic segmentation information, e.g., to determine whether the detected edges align with divisions between object classifications identified from the semantic segmentation information.

The error determination component 434 can include functionality to determine misalignment of features, e.g., features detected by the feature detection component 432, relative to an expected feature associated with objects identified in the semantic segmentation information, e.g., generated by the semantic segmentation component 430. For instance, the error determination component can identify a distance between points in sensor data corresponding to a feature and a line, plane, or other feature that represents the expected feature or attribute of the object to which the semantic segmentation information indicates the points are associated. In the instance of an edge or a plane, the error determination component 434 can include functionality to fit a line or plane to sensed data and determine an error, e.g., offset, of the fit line/plane to the expected return, based on the semantic segmentation information.

The undistort component 436 can include functionality to undistort sensor returns, e.g., distorted image data, for comparison to attributes of invariant objects and/or invariant features. In some examples, the undistort component 436 can store calibration data associated with one or more sensors of the vehicle 402. In some instances, the calibration data can include information about sensor intrinsics. In some instances, the calibration data can include any extrinsic and/or intrinsic information associated with the one or more sensors, including but not limited to, calibration angles, mounting location, height, direction, yaw, tilt, pan, timing information, lens distortion parameters, transmission medium parameters, and the like. Further, the calibration component 428 can store a log of some or all of the calibration operations performed, such as a time elapsed from the most recent calibration, and the like. As noted above when discussing the example of FIG. 1, calibration error/validation can be carried out using techniques described herein with explicitly undistorting sensor data. In that example, the invariant feature, e.g., the line associated with the signpost can be distorted into the distorted space of the image 110. In at least some examples, an optimization may be performed with respect to an assumed calibration to minimize the error and find an improved calibration.

In some examples, the calibration component 428, e.g., executing the error determination component 434, can determine whether a calibration error is significant enough to impact continued use of the sensor. By way of non-limiting example, if an error is equal to or above a threshold error for a sensor, the calibration component 428 can communicate a sensor failure to other components of the vehicle 402. For instance, the localization component 420, the perception component 422, and/or the planning component 424 may perform functions at the exclusion of the improperly calibrated sensor. Other functioning may similarly be limited. In other examples, the calibration component 428 can cause the system controller(s) 426 to stop the vehicle 402 until sensor calibration can be performed and/or can send information to a remote source, e.g., a teleoperator, to inform of the sensor misalignment and/or request instructions for proceeding.

In some instances, the calibration component 428 may also include functionality to determine a correction function for correcting the calibration error associated with the sensor system(s) 406. For example, the calibration component 428 can use the error determined by the error determination component 434 to adjust senor data. To correct sensor data, e.g., using a correction function, the calibration component 428 may consider data from a plurality of frames, returns, or the like, and may consider miscalibration relative to a number of different invariant objects. For instance, while the example of FIG. 1 may be sufficient to identify calibration error, e.g., because the points may not be collinear, correcting the error may not be accomplished based only on those points. In implementations, errors associated with a number of different invariant objects and/or invariant features may be required to determine a calibration function. Moreover, the relationship of invariant objects may also be considered when determining a calibration function. By way of non-limiting example, because the two invariant objects in FIG. 3 (i.e., the building and the drivable surface) have planes that are expected to be perpendicular, the calibration component 428 may better develop a calibration function, e.g., by minimizing errors in multiple degrees of freedom. However, additional information may be necessary in further embodiments to accurately determine a calibration function.

In some instances, aspects of some or all of the components discussed herein may include any models, algorithms, and/or machine learning algorithms. For example, in some instances, the components in the memory 418 (and memory 446, discussed below) may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 4 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet30, ResNet101, VGG, DenseNet, PointNet, and the like.

The map(s) 438 can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In some examples, the map(s)

438 can include at least one map (e.g., images and/or a mesh). The vehicle 402 can be controlled based at least in part on the map(s) 438. That is, the map(s) 438 can be used in connection with the localization component 420, the perception component 422, the planning component 424, and/or the calibration component 428 to determine a location of the vehicle 402, identify objects in an environment, and/or generate routes and/or trajectories to navigate within an environment. Moreover, and as described herein, the map(s) 438 can include semantic segmentation information about invariant objects in an environment. By way of non-limiting example, semantic segmentation information contained in maps may be used in addition to, or instead of, semantic segmentation information generated by the semantic segmentation component 430. In some examples, one or more of the map(s) 438 may include an aggregation of semantic segmentation information generated using sensor data generated by the vehicle 402 and/or one or more additional vehicles.

In at least one example, the sensor system(s) 406 can include LIDAR sensors, radar sensors, time-of-flight sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the LIDAR sensors (and/or radar sensors) can include individual LIDAR sensors (or radar sensors) located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device 404. Additionally, or alternatively, the sensor system(s) 406 can send sensor data, via one or more networks 440, to one or more remote computing devices at a particular frequency, after a lapse of a predetermined period of time, in near real-time, etc.

In some examples, the sensor system(s) 406 can be active sensor systems, e.g., that include controls for actively adjusting parameters thereof. For example, some cameras may have adjustable shutter speed or exposure time. Similarly, time-of-flight sensors, LiDAR sensors, radar sensors, and the like may have actively adjustable intensity and/or gain attributes. In some implementations, the semantic segmentation information may be further used to adjust one or more settings of the sensor. For example, when the semantic segmentation information identifies a certain class of type of object in the environment of a sensor, the sensor can be adjusted to optimize sensing of that object. For instance, when certain objects that are expected to have an expected color or brightness are identified from the semantic segmentation information, the intensity of emitted light can be adjusted to optimize sensing.

The emitter(s) 408 can include structure and functionality for emitting light and/or sound. The emitter(s) 408 can include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 can also include exterior emitters. By way of example and not limitation, the exterior emitters in this example can include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The communication connection(s) 410 can enable communication between the vehicle 402 and one or more other local or remote computing device(s). For instance, the communication connection(s) 410 can facilitate communication with other local computing device(s) on the vehicle 402 and/or the drive module(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communications connection(s) 410 can include physical and/or logical interfaces for connecting the vehicle computing device 404 to another computing device or a network, such as the network(s) 440. For example, the communications connection(s) 410 can enable Wi-Fi-based communication such as via frequencies defined by the IEEE 802.11 standards, short range wireless frequencies such as Bluetooth, cellular communication (e.g., 2G, 4G, 4G, 4G LTE, 5G, etc.) or any suitable wired or wireless communications protocol that enables the respective computing device to interface with the other computing device(s).

The drive module(s) 414 can include many of the vehicle systems, including a high voltage battery, a motor to propel the vehicle 402, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 414 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 414. Furthermore, the drive module(s) 414 also include one or more communication connection(s) that enable communication by the respective drive module with one or more other local or remote computing device(s).

In some examples, the drive module(s) 414 may be a single drive module 414. In at least one example, if the vehicle 402 has multiple drive modules 414, individual drive modules 414 can be positioned on opposite ends of the vehicle 402 (e.g., the front and the rear, etc.). In at least one example, the drive module(s) 414 can include one or more sensor systems to detect conditions of the drive module(s) 414 and/or the surroundings of the vehicle 402. By way of example and not limitation, the sensor system(s) 406 can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 414. In some cases, the sensor system(s) on the drive module(s) 414 can overlap or supplement corresponding systems of the vehicle 402 (e.g., the sensor system(s) 406).

The processor(s) 416 of the vehicle 402 can be any suitable processor capable of executing instructions to process data and perform operations as described herein. By way of example and not limitation, the processor(s) 416 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 is an example of non-transitory computer-readable media. The memory 418 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

While FIG. 4 is illustrated as a distributed system, in alternative examples, components of the vehicle 402 can be associated with remote computing devices accessible via the network(s) 440. For example, the vehicle 402 can send sensor data to one or more computing device(s) 442, via the network(s) 440. In some examples, the vehicle 402 can send raw sensor data to the computing device(s) 442. In other examples, the vehicle 402 can send processed sensor data and/or representations of sensor data to the computing device(s) 442. In some examples, the vehicle 402 can send sensor data to the computing device(s) 442 at a particular frequency, after a lapse of a predetermined period of time, in near real-time, etc. In some cases, the vehicle 402 can send sensor data (raw or processed) to the computing device(s) 442 as one or more log files.

The computing device(s) 442 can receive the sensor data (raw or processed) and can perform calibration operations on the data. In at least one example, the computing device(s) 442 can include one or more processors 444 and memory 446 communicatively coupled with the processor(s) 444. In the illustrated example, the memory 446 of the computing device(s) 442 stores a calibration component 448, a semantic segmentation component 450, and/or map(s) 452. The calibration component 448 can include functionality to perform operations similar to those discussed above in the context of the calibration component 428, the semantic segmentation component 450 can include functionality to perform operations similar to those discussed above in the context of the semantic segmentation component 430, and the map(s) 452 may correspond to the map(s) 438. In some instances, the processor(s) 444 and the memory 446 can include functionality and/or structure similar to that discussed above with respect to the processor(s) 416 and the memory 418.

FIGS. 1, 2, 3, 5, and 6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
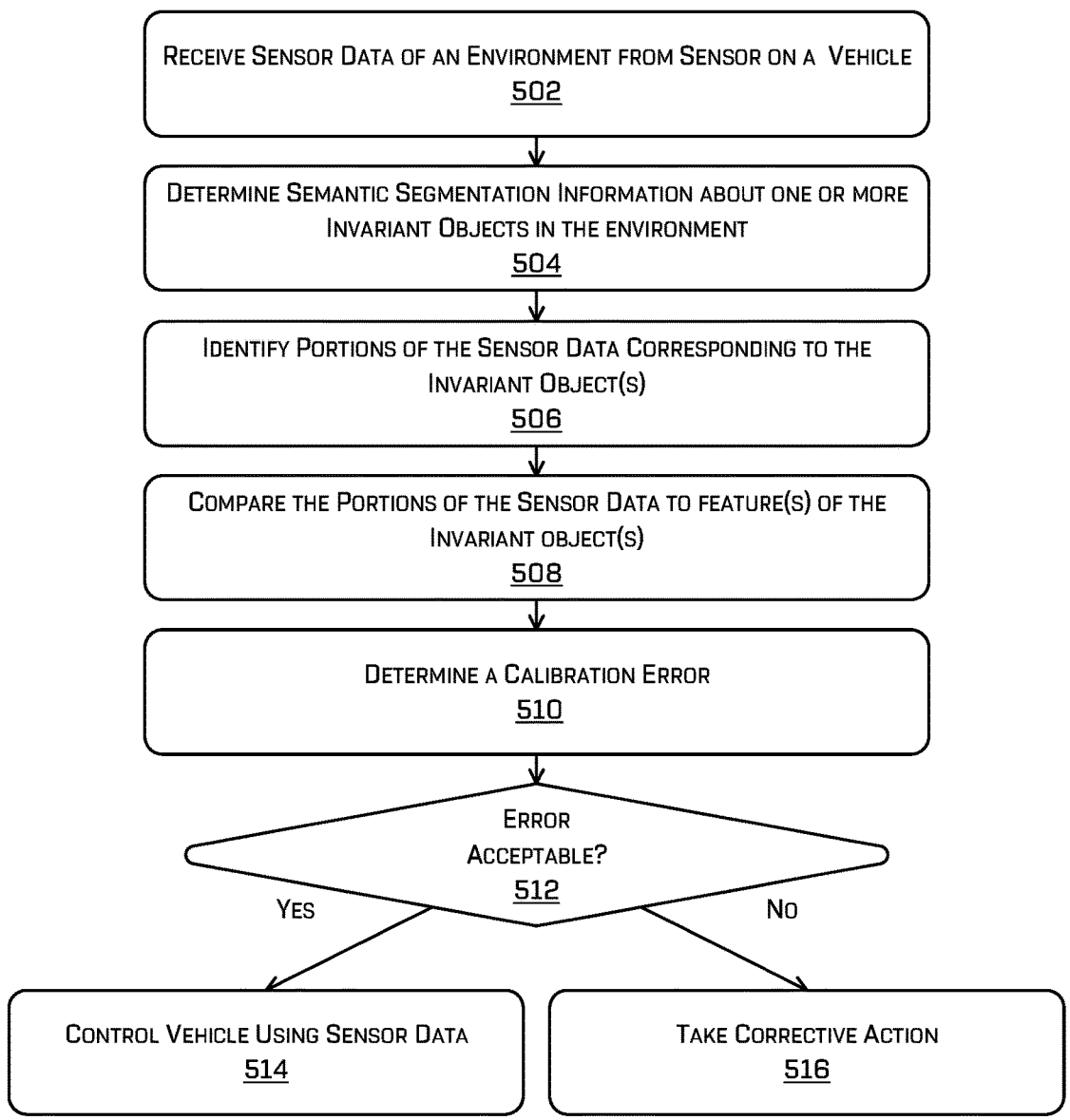
FIG. 5 is an example process for verifying sensor calibration using semantic segmentation information, in accordance with implementations described herein.

FIG. 5 depicts an example process 500 for determining a calibration error associated with a sensor. For example, some or all of the process 500 can be performed by one or more components in FIG. 4, as described herein. For example, some or all of the process 500 can be performed by the calibration components 428 and/or 448.

At operation 502, the process 500 can include receiving sensor data of the environment from a sensor mounted on a vehicle. In some examples, the senor data may be generated by the sensor as the vehicle traverses through the environment. The vehicle may be an autonomous vehicle. In implementations of this disclosure, the sensor can be any of a number of sensor modalities, including but not limited to, an image sensor (e.g., a camera), a LiDAR sensor, radar, depth cameras, or a time-of-flight sensor.

At operation 504, the process 500 can include receiving semantic segmentation information about one or more invariant objects in an environment. In some examples, the semantic segmentation information may be generated in real time or near-real time, e.g., by a perception component of an autonomous vehicle, based on the sensor data received at the operation 502 and/or other sensor data. In some examples, e.g., in which the location and pose of the vehicle are known the semantic segmentation information can be generated based at least in part from historical data and available to the vehicle, e.g., from a map. The semantic segmentation information can include information about a classification associated with portions of the sensor data, e.g., on a per-pixel basis, per lidar point basis, per radar return basis, and the like, though any other semantic segmentation is contemplated (e.g., drivable surfaces, geometric features, etc.). For instance, the classifications can include such labels as vehicle, pedestrian, drivable surface, building, vegetation, curb, or the like. In examples described herein, semantic segmentation information about invariant objects may be received at the operation 502. For instance, invariant objects may be objects in the environment that have a known shape, size, orientation, or the like, or otherwise comprise known geometries (flat planes, linear edges, and the like). In some examples, invariant objects can include a known feature, e.g., a straight edge, a planar surface, and/or some other attribute, such as reflectivity, color, a pattern, line, or the like.

At operation 506, the process 500 can include identifying one or more portions of the sensor data corresponding to the invariant object(s). In some examples, the operation 506 can identify those points, pixels, returns, or the like that are representative of the invariant object(s). Also in examples, the operation 506 can perform feature extraction and/or edge detection on the sensor data, e.g., to determine boundaries of objects in image data. Moreover, depth discontinuities in LiDAR, time-of-flight, or other depth data may be identified to determine edges in the environment. Moreover, in some examples, the feature extraction can identify a grouping of points, e.g., in a point cloud, associated with a planar surface. Other features may also be identified in the operation 506. In some examples, the operation 506 can also include undistorting, e.g., undistorting using sensor intrinsics, the sensor data, with the features being identified in an undistorted image, as discussed further above with reference to FIG. 2. In other examples, however, information about the sensor, e.g., about sensor intrinsics, can be used to "distort" an invariant feature for comparison, as described herein.

At operation 508, the process 500 can include comparing the portions of the sensor data to features of the invariant object(s). As described herein, when a sensor is properly calibrated, the sensor data should conform with features in invariant objects, e.g., known lines, planes, or the like. Thus, for example, the operation 508 can include determining whether such conformance exists. In some examples, edges in the sensor data may be compared to lines approximating edges of signposts, lampposts, buildings, and/or the like. As noted above, the semantic segmentation information can be chosen because it includes an invariant feature. In other examples, depth information can be compared to a planar surface of an invariant object. As noted above, the operation 510 may require undistorting of sensor data, e.g., using sensor intrinsics, or the operation 510 may require distorting invariant features, e.g., lines, into a camera space.

At operation 510, the process 500 can include determining a calibration error. In some instances, the operation 510 can measure a distance, e.g., a Euclidian distance between the portions of the sensor data and the attributes of the invariant object. In some examples, points on a feature, e.g., an edge or linear feature, determined in the sensor data can be compared to a line, e.g., to determine collinearity. In other implementations, the calibration error can be a distance, e.g., an average distance of points, relative to a planar surface that defines an invariant feature.

At operation 512, the process 500 may determine whether the calibration error is acceptable. For example, the calibration error determined at the operation 510 can be compared to a threshold error. The calibration error can be an average of a number of points, including points associated with different objects and/or features, or individual points can be compared to the threshold, an average distance from a line or plane, a measure of collinearity or coplanarity, or the like.

If, at operation 512, it is determined that the calibration error is equal to or less than a threshold error, i.e., that the error is acceptable, at operation 514 the process 500 can include controlling the vehicle using the sensor data. Thus, for example, the process 500 can serve as a verification that the sensor(s) continue to be properly calibrated, e.g., within a predetermined threshold.

Alternatively, if, at operation 512 it is determined that the calibration error is equal to or greater than a threshold error, i.e., that the error is not acceptable, at operation 516 the process 500 can include taking a corrective action. In some examples, the corrective action may include discontinuing reliance on the sensor data until the sensor can be re-calibrated. In other implementations, for example, in instances in which the discontinuing use of the sensor data would result in unsafe operation of the vehicle, the corrective action may include taking the vehicle out of service and/or requesting assistance to continuing navigation. In still other examples, the corrective action may include determining updated calibration information and calibrating subsequent sensor data in accordance with the updated calibration information. For example, implementations described herein may determine a calibration function that minimizes the calibration error determined at the operation 510. In some examples, the calibration function may be determined over several iterations of the sensor data, e.g., over a period of time or number of returns, and/or based on other data, including data from other sensors, the semantic segmentation information, or the like. The calibration function may be used to undistort subsequently generated sensor data. For example, the operation 516 can include sending the calibration function to one or more of a localization system (e.g., the localization component 420), a perception system (e.g., the perception component 422), and the like. In some instances, the calibration function can be used by one or more systems of the vehicle to align or otherwise adjust data captured by the one or more sensors so that the data can represent the environment in a more accurate manner. Thus, for example, while techniques described herein can be used to validate sensor data, e.g., by determining that a calibration error is within a threshold error, techniques described herein may also be used to calibrate data, e.g., when a calibration error indicates that the sensor is no longer properly calibrated.

Figure 6:
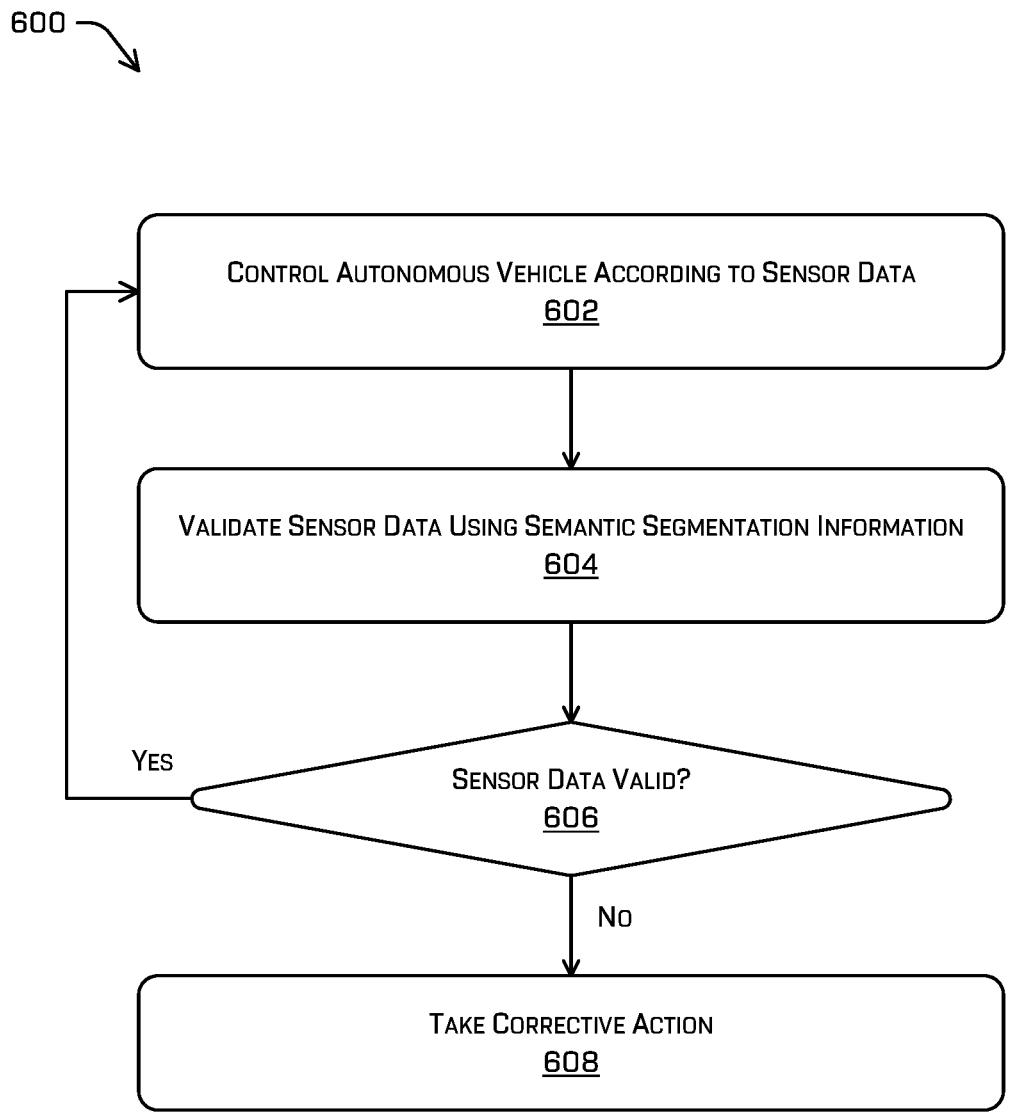
FIG. 6 is another example process for controlling an autonomous vehicle based at least in part on calibrated sensor data, in accordance with implementations described herein.

FIG. 6 depicts an example process 600 for controlling an autonomous vehicle based at least in part on calibrated sensor data, as discussed herein. For example, some or all of the process 600 can be performed by one or more components in FIG. 4, as described herein. For example, some or all of the process 600 can be performed by the localization component 420, the perception component 422, the planning component 424, and/or the one or more system controllers 426.

At operation 602, the process 600 can include controlling an autonomous vehicle according to sensor data. As described herein, an autonomous vehicle may include one or more sensor systems of one or multiple modalities. Various components, including the localization component 420, the perception component 422, the planning component 424, and/or the system controllers 426 may rely on the sensor data to determine and execute drive instructions, e.g., trajectories, for the autonomous vehicle 402. By way of non-limiting example, the controls for the vehicle can be based on a presence of objects or agents external to an autonomous vehicle in an environment and represented in the sensor data.

At operation 604, the process 600 can include validating the sensor data using semantic segmentation information. For example, the operation 604 can include the processes 100, 200, 300, and/or 500 discussed above, in which semantic segmentation information is used to determine portions of sensor data associated with invariant objects and those portions of the sensor data are compared to attributes or features, e.g., expected linearity, planarity, or the like, of the invariant objects.

At operation 606, the process 600 can determine whether the operation 604 successfully validated the sensor data. By way of non-limiting example, the sensor data may be validated when the portions of the sensor data comport with an expected feature within a threshold error. If, at operation

606, it is determined that the sensor data is valid, processing returns to the operation 602, and the vehicle continues to be controlled according to the sensor data, e.g., because the sensor data is valid within a threshold error.

However, if, at operation 606, it is determined that the sensor data is not valid, at operation 608, the process 600 can include taking a corrective action. In some examples, the corrective action may include discontinuing reliance on the sensor data until the sensor can be re-calibrated. In other implementations, for example, in instances in which the discontinuing use of the sensor data would result in unsafe operation of the vehicle, the corrective action may include taking the vehicle out of service and/or requesting assistance to continuing navigation. In still other examples, the corrective action may include determining updated calibration information and calibrating subsequent sensor data in accordance with the updated calibration information.

As will be appreciated, according to the process 600, sensor validation can be performed in real-time or at near real-time. Accordingly, the vehicle can take corrective action in real-time or near real-time, thereby increasing operation safety of the vehicle, among other benefits.

EXAMPLE CLAUSES

A: An example autonomous vehicle includes: a sensor disposed on the autonomous vehicle: one or more processors; and non-transitory computer-readable media storing one or more instructions that, when executed, cause the one or more processors to perform acts comprising: receiving, from the sensor, sensor data of an environment of the vehicle, segmenting, as segmented data, the sensor data based at least in part on a representation of an invariant object in the sensor data, determining, based at least in part on the segmented data, a subset of the sensor data associated with the invariant object, and determining, based at least in part on the subset of the sensor data, a calibration error associated with the sensor.

B: The autonomous vehicle of example A, wherein determining the calibration error includes: generating, from the sensor data and according to a calibration function associated with the sensor, undistorted sensor data; and comparing the undistorted sensor data to a feature of the invariant object.

C: The autonomous vehicle of example A or example B, wherein the comparing the undistorted sensor data to the feature of the invariant object comprises comparing the at least a portion of the subset of the sensor data to at least one of a line, a plane, or a reflectivity of the invariant object.

D: The autonomous vehicle of any one of example A through example C, wherein the determining the calibration error comprises determining a distance between at least a portion of the subset of the sensor data and a line or a plane associated with the invariant object.

E: The autonomous vehicle of any one of example A through example D, the acts further comprising: calibrating, based at least in part on the calibration error, the sensor; generating, based at least in part on the calibrated sensor, a trajectory to control the autonomous vehicle; and controlling the autonomous vehicle based at least in part on the trajectory.

F: An example method includes: receiving, from a sensor, sensor data of an environment; determining, based at least in part on the sensor data, segmentation information about the environment; determining, based at least in part on the segmentation information, a subset of the sensor data corresponding to an invariant object; identifying, in the subset of the sensor data, at least one feature corresponding to a feature of the invariant object; and determining, based at least in part on the at least one feature, a calibration error of the sensor.

G: The method of example F, further comprising: undistorting the at least one feature based at least in part on one or both of sensor intrinsic information or sensor extrinsic information.

H: The method of example F or example G, wherein the segmentation information comprises associations between portions of the data and a plurality of objects in the environment depicted in the portions, the method further comprising: determining, the invariant object from the plurality of objects; and determining, based at least in part on the one or more associations, the portion of the sensor data corresponding to the invariant object.

I: The method of any one of example F through example H, wherein the invariant object comprises an object having a known attribute, the attribute comprising at least one of linearity, planarity, reflectivity, or an orientation.

J: The method of any one of example F through example I, wherein the invariant object is at least one of a topographical feature, a fixture, a building, or a horizon line.

K: The method of example F through example J, wherein the invariant object includes at least one of a linear feature or a planar feature.

L: The method of any one of example F through example K, wherein the determining the calibration error comprises quantifying an error associated with at least a portion of the subset of the sensor data relative to at least one of a line corresponding to the linear feature or a plane corresponding to the planar feature.

M: The method of any one of example F through example L, wherein: the sensor comprises at least one of a LiDAR sensor, depth sensor, multi-view image, or a time-of-flight sensor; the invariant object comprises a planar surface; and the determining the calibration error comprises determining a distance between depths measured by the sensor and a plane corresponding to the planar surface.

N: The method of any one of example F through example M, wherein: the sensor comprises at least one of a camera, a LiDAR senor, or a time-of-flight sensor; the invariant object comprises a linear feature; and the determining the calibration error comprises determining a distance between points on an edge detected in the sensor data and a line corresponding to the linear feature.

O: The method of any one of example F through example N, further comprising: determining, based at least in part on the calibration error, a calibration function for the sensor; and calibrating the sensor using the calibration function.

P: The method of any one of example F through example O, further comprising: adjusting, based at least in part on the semantic segmentation information, a setting of the sensor, the setting comprising at least one of an exposure time, an emitted light intensity, or a gain of the sensor.

Q: An example non-transitory computer-readable medium storing instructions that, when executed, cause one or more processors to perform operations comprising: receiving, from a sensor, sensor data of an environment; determining, based at least in part on the sensor data, information about the environment; determining, based at least in part on the information, a subset of the sensor data corresponding to an invariant object; identifying, in the subset of the sensor data, at least one feature corresponding to a feature of the invariant object; and determining, based at least in part on the at least one feature, a calibration error of the sensor.

R: The non-transitory computer-readable medium of example Q, wherein the information comprises associations between portions of the data and a plurality of objects in the environment depicted in the portions, the operations further comprising: determining, the invariant object from the plurality of objects; and determining, based at least in part on the one or more associations, the portion of the sensor data corresponding to the invariant object.

S: The non-transitory computer-readable medium of example Q or example R, wherein: the sensor comprises at least one of a camera, a LiDAR senor, or a time-of-flight sensor; the invariant object comprises a linear feature; and the determining the calibration error comprises determining a distance between points on an edge detected in the sensor data and a line corresponding to the linear feature.

T: The non-transitory computer-readable medium of any one of example Q through example S, wherein the information comprises associations between pixels and one or more objects in the environment depicted in the pixels, the method further comprising: determining, based at least in part on the one or more associations, a semantic segmentation information subset associated with an object of the one or more objects depicted in the pixels; and determining, from the sensor data, a sensor data subset representative of the object, wherein the comparing sensor data to the information comprises comparing the sensor data subset to the semantic segmentation information subset.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. An autonomous vehicle comprising:
a sensor disposed on the autonomous vehicle:
one or more processors; and
non-transitory computer-readable media storing one or more instructions that, when executed, cause the one or more processors to perform acts comprising:
receiving, from the sensor, sensor data of an environment of the vehicle, the sensor data including one or more distortions associated with one or more intrinsic characteristics of the sensor,
generating, from the sensor data and based on the one or more intrinsic characteristics of the sensor, undistorted sensor data free of the one or more distortions,
segmenting, as segmented data, the undistorted sensor data based at least in part on a representation of an invariant object in the undistorted sensor data, the invariant object having a known attribute,
determining, based at least in part on the segmented data, a subset of the undistorted sensor data associated with the invariant object, and
determining, based at least in part on the subset of the undistorted sensor data and the known attribute, a calibration error associated with the sensor.

2. The autonomous vehicle of claim 1, wherein determining the calibration error comprises:
determining, based at least in part on comparing the undistorted sensor data to the known attribute, a distance between the undistorted sensor data and an expected value associated with the known attribute of the invariant object.

3. The autonomous vehicle of claim 2, wherein the comparing the undistorted sensor data to the known attribute of the invariant object comprises comparing the at least a portion of the subset of the undistorted sensor data to at least one of a line, a plane, or a reflectivity of the invariant object.

4. The autonomous vehicle of claim 1, the acts further comprising:
calibrating, based at least in part on the calibration error, the sensor;
generating, based at least in part on the calibrated sensor, a trajectory to control the autonomous vehicle; and
controlling the autonomous vehicle based at least in part on the trajectory.

5. The autonomous vehicle of claim 1, wherein generating undistorted sensor data comprises:
identifying, in the sensor data, a feature location corresponding to at least one feature associated with the invariant object; and
determining, based on a distortion model of the sensor, a true location corresponding to the feature location.

6. A method comprising:
receiving, from a sensor, sensor data of an environment;
generating, based at least in part on removing one or more distortions from the sensor data, undistorted sensor data, the removing the one or more distortions being based at least in part on one or more intrinsic characteristics of the sensor;
determining, based at least in part on the undistorted sensor data, segmentation information about the environment;
determining, based at least in part on the segmentation information, a subset of the undistorted sensor data corresponding to an invariant object, the invariant object having a known attribute;
identifying, in the subset of the undistorted sensor data, at least one feature corresponding to the known attribute of the invariant object; and
determining, based at least in part on the at least one feature and the known attribute, a calibration error of the sensor.

7. The method of claim 6, wherein the generating the undistorted sensor data comprises:
undistorting the sensor data based at least in part on sensor extrinsic information.

8. The method of claim 7, wherein the segmentation information comprises associations between portions of the data and a plurality of objects in the environment depicted in the portions, the method further comprising:
determining, the invariant object from the plurality of objects; and determining, based at least in part on the associations, the portion of the sensor data corresponding to the invariant object.

9. The method of claim 8, wherein:
the sensor comprises at least one of a camera, a LiDAR senor, or a time-of-flight sensor;
the invariant object comprises a reflective feature; and
the determining the calibration error comprises determining a difference between points of known reflectivity on the invariant object and corresponding points in the portion of the sensor data corresponding to the invariant object.

10. The method of claim 6, wherein the invariant object is at least one of a topographical feature, a fixture, a building, or a horizon line.

11. The method of claim 10, wherein the invariant object includes at least one of a linear feature, a planar feature, or a feature exhibiting a characteristic reflectivity.

12. The method of claim 11, wherein the determining the calibration error comprises quantifying an error associated with a portion of the subset of the sensor data corresponding to a line of the linear feature or a plane of the planar feature.

13. The method of claim 6, wherein:
the sensor comprises at least one of a LiDAR sensor, depth sensor, multi-view image, or a time-of-flight sensor;
the invariant object comprises a planar surface; and
the determining the calibration error comprises determining a distance between depths measured by the sensor and a plane corresponding to the planar surface.

14. The method of claim 6, wherein:
the sensor comprises at least one of a camera, a LiDAR senor, or a time-of-flight sensor;
the invariant object comprises a linear feature; and
the determining the calibration error comprises determining a distance between points on an edge detected in the sensor data and a line corresponding to the linear feature.

15. The method of claim 6, further comprising:
determining, based at least in part on the calibration error, a calibration function for the sensor; and
calibrating the sensor using the calibration function.

16. The method of claim 6, further comprising:
adjusting, based at least in part on the segmentation information, a setting of the sensor, the setting comprising at least one of an exposure time, an emitted light intensity, or a gain of the sensor.

17. A non-transitory computer-readable medium storing instructions that, when executed, cause one or more processors to perform operations comprising: receiving, from a sensor, sensor data of an environment;
generating, based at least in part on removing one or more distortions from the sensor data, undistorted sensor data, the removing the one or more distortions being based at least in part on one or more intrinsic characteristics of the sensor;
determining, based at least in part on the undistorted sensor data, segmentation information about the environment;
determining, based at least in part on the segmentation information, a subset of the undistorted sensor data corresponding to an invariant object, the invariant object having a known attribute;
identifying, in the subset of the undistorted sensor data, at least one feature corresponding to the known attribute of the invariant object; and
determining, based at least in part on the at least one feature and the known attribute, a calibration error of the sensor.

18. The non-transitory computer-readable medium of claim 17, wherein the information comprises one or more associations between portions of the data and a plurality of objects in the environment depicted in the portions, the operations further comprising:
determining, the invariant object from the plurality of objects; and
determining, based at least in part on the one or more associations, the portion of the sensor data corresponding to the invariant object.

19. The non-transitory computer-readable medium of claim 17, wherein:
the sensor comprises at least one of a camera, a LiDAR senor, or a time-of-flight sensor;
the invariant object comprises a linear feature; and
the determining the calibration error comprises determining a distance between points on an edge detected in the sensor data and a line corresponding to the linear feature.

20. The non-transitory computer-readable medium of claim 17, wherein the information comprises associations between pixels and one or more objects in the environment depicted in the pixels, the operations further comprising:
determining, based at least in part on the associations, a semantic segmentation information subset associated with an object of the one or more objects depicted in the pixels; and
determining, from the sensor data, a sensor data subset representative of the object,
wherein determining the subset of the sensor data corresponding to the invariant object comprises comparing the sensor data subset to the semantic segmentation information subset.

* * * * *